United States Patent
Karnes

(10) Patent No.: US 9,971,620 B2
(45) Date of Patent: May 15, 2018

(54) METHODS AND SYSTEMS FOR NETWORK PACKET IMPAIRMENT WITHIN VIRTUAL MACHINE HOST SYSTEMS

(71) Applicant: Anue Systems, Inc., Austin, TX (US)

(72) Inventor: Joshua D. Karnes, Cedar Park, TX (US)

(73) Assignee: Keysight Technologies Singapore (Holdings) PTE LTD, Singapore (SG)

( * ) Notice: Subject to any disclaimer, the term of this patent is extended or adjusted under 35 U.S.C. 154(b) by 0 days. days.

(21) Appl. No.: 14/515,098

(22) Filed: Oct. 15, 2014

(65) Prior Publication Data
US 2016/0110212 A1    Apr. 21, 2016

(51) Int. Cl.
  *G06F 9/46* (2006.01)
  *G06F 9/455* (2018.01)
  *H04L 12/721* (2013.01)

(52) U.S. Cl.
  CPC .......... *G06F 9/45558* (2013.01); *H04L 45/14* (2013.01); *G06F 2009/45595* (2013.01)

(58) Field of Classification Search
  CPC ....... G06F 9/45558; G06F 2009/45595; G06F 9/4558; H04L 45/26; H04L 47/00–47/22; H04L 45/14–45/24; G04L 45/14
  See application file for complete search history.

(56) References Cited

U.S. PATENT DOCUMENTS

| | | | |
|---|---|---|---|
| 8,064,485 B1 | 11/2011 | Montini et al. | |
| 8,098,677 B1 | 1/2012 | Pleshek et al. | |
| 8,767,752 B1* | 7/2014 | Tripathi | H04L 47/11 370/401 |
| 8,789,049 B2 | 7/2014 | Hutchins et al. | |
| 8,861,369 B2 | 10/2014 | Reed | |
| 8,935,457 B2* | 1/2015 | Feng | G06F 9/06 370/389 |
| 8,972,981 B2 | 3/2015 | Delco et al. | |
| 9,008,080 B1 | 4/2015 | Mehta et al. | |

(Continued)

OTHER PUBLICATIONS

ZTI Communication, Impairment Emulator Software for IP Network (IPv4 & IPv6), Version 6.1; Copyright ©2014 ZTI Communications—All rights reserved. Orange licensed product. Created and modified on Apr. 24, 2014.*

(Continued)

*Primary Examiner* — Thuy Dao
*Assistant Examiner* — Mongbao Nguyen

(57) ABSTRACT

Methods and systems for network packet impairment within virtual machine (VM) host systems are disclosed that provide virtual impairment processors within VM host hardware systems. One or more processing devices within a virtual machine (VM) host system are operated to provide at least one virtual machine (VM) platform, a virtual switch, and a virtual impairment processor within a virtualization layer for the VM host system. Network packets associated with packet traffic for the at least one VM platform using the virtual switch. The virtual impairment processor then applies one or more impairments to the network packets such as a drop, modify, delay, and/or other packet impairment. The impaired packets are then forwarded by the virtual switch to target destinations for the impaired network packets using the virtual switch.

13 Claims, 5 Drawing Sheets

(56) References Cited

U.S. PATENT DOCUMENTS

| | | | |
|---|---|---|---|
| 9,037,775 B2* | 5/2015 | Feng | G06F 9/06 370/389 |
| 9,152,552 B2* | 10/2015 | Buswell | H04L 49/90 |
| 9,166,992 B1 | 10/2015 | Stickle et al. | |
| 9,344,265 B2 | 5/2016 | Karnes | |
| 9,485,191 B2 | 11/2016 | Sindhu | |
| 9,548,900 B1* | 1/2017 | Ramasubramanian | H04L 45/04 |
| 9,647,909 B2 | 5/2017 | Kuan et al. | |
| 9,703,589 B2* | 7/2017 | Zheng | G06F 9/45558 |
| 9,825,854 B2* | 11/2017 | Xiao | H04L 45/74 |
| 2007/0143453 A1* | 6/2007 | Huang | H04L 41/0826 709/220 |
| 2009/0073895 A1 | 3/2009 | Morgan et al. | |
| 2010/0254499 A1 | 10/2010 | Thavisri | |
| 2010/0329125 A1 | 12/2010 | Roberts et al. | |
| 2011/0299537 A1* | 12/2011 | Saraiya | H04L 61/2596 370/392 |
| 2011/0313753 A1* | 12/2011 | Green | H04L 12/18 703/28 |
| 2012/0185914 A1 | 7/2012 | Delco et al. | |
| 2012/0230202 A1 | 9/2012 | Reed | |
| 2012/0284712 A1 | 11/2012 | Nimmagadda et al. | |
| 2012/0317566 A1* | 12/2012 | Santos | G06F 9/45558 718/1 |
| 2013/0031294 A1* | 1/2013 | Feng | G06F 9/06 711/6 |
| 2013/0064095 A1* | 3/2013 | Chew | H04L 43/50 370/241 |
| 2013/0070762 A1* | 3/2013 | Adams | H04L 49/70 370/389 |
| 2013/0086236 A1* | 4/2013 | Baucke | H04L 45/50 709/223 |
| 2013/0125120 A1 | 5/2013 | Zhang et al. | |
| 2013/0148503 A1* | 6/2013 | Hutchison | H04L 43/50 370/235 |
| 2013/0215889 A1 | 8/2013 | Zheng et al. | |
| 2013/0301425 A1* | 11/2013 | Udutha | H04L 12/4641 370/242 |
| 2014/0181818 A1* | 6/2014 | Vincent | G06F 9/5094 718/1 |
| 2014/0192804 A1* | 7/2014 | Ghanwani | H04L 49/70 370/390 |
| 2014/0215463 A1* | 7/2014 | Hendel | G06F 9/45533 718/1 |
| 2014/0226661 A1* | 8/2014 | Mekkattuparamban | H04L 49/70 370/392 |
| 2015/0009809 A1* | 1/2015 | Zhang | H04L 47/35 370/230 |
| 2015/0029853 A1* | 1/2015 | Raindel | H04L 47/127 370/235 |
| 2015/0043581 A1* | 2/2015 | Devireddy | H04L 49/70 370/392 |
| 2015/0074661 A1* | 3/2015 | Kothari | H04L 49/70 718/1 |
| 2015/0100670 A1 | 4/2015 | Anantharam et al. | |
| 2015/0146527 A1* | 5/2015 | Kishore | H04L 47/2441 370/230.1 |
| 2015/0244617 A1* | 8/2015 | Nakil | G06F 9/45558 709/224 |
| 2015/0250001 A1* | 9/2015 | Tan | H04N 21/8455 370/329 |
| 2015/0281120 A1 | 10/2015 | Sindhu | |
| 2016/0026490 A1 | 1/2016 | Johnsson et al. | |
| 2016/0087859 A1 | 3/2016 | Kuan et al. | |
| 2016/0087861 A1 | 3/2016 | Kuan et al. | |
| 2017/0163570 A1* | 6/2017 | Casado | H04L 49/25 |

OTHER PUBLICATIONS

Abhinava Sadasivarao, Open Transport Switch—A Software Defined Networking Architecture for Transport Networks, 2013, pp. 1-7. https://www.es.net/assets/pubs_presos/hots021-ots.pdf (Year: 2013).*

Operativesoft, Network Simulation—Traffic, Paths and Impairment, 2011, pp. 1-5. http://www.operativesoft.com/Product/Network%20Simulation.pdf (Year: 2011).*

Vikram R. Desai, Techniques for Detection of Malicious Packet Drops in Networks, Feb. 2014, pp. 24-40. https://scholarworks.umass.edu (Year: 2014).*

Patent Application, Karnes, "Network Packet Timing Synchronization for Virtual Machine Host Systems", U.S. Appl. No. 14/514,999, filed Oct. 15, 2014, 44 pgs.

Patent Application, Karnes, "Methods and Systems for Forwarding Network Packets Within Virtual Machine Host Systems", U.S. Appl. No. 14/515,043, filed Oct. 15, 2014, 24 pgs.

Office Action dated Oct. 1, 2015, Karnes, "Network Packet Timing Synchronization for Virtual Machine Host Systems", U.S. Appl. No. 14/514,999, filed Oct. 15, 2014, 10 pgs.

Chauhan et al., "Is Doing Clock Synchronization in a VM a Good Idea?", 8 pgs. (2011).

Hirschmann, White Paper, "Precision Clock Synchronization", The Standard IEEE 1588, 20 pgs. (Jul. 2009).

Ridoux et al., "The Case for Feed-Forward Clock Synchronization", 12j pgs. (Feb. 2012).

Cisco Connected Grid Switches System Management Software Configuration Guide, Chapter 5, "Configuring Precision Time Protocol", 16 pgs. (May 2014).

SearchServerVirtualization.com, "Solutions to Five Most Common Problems With Virtualization", 4 pgs. (May 2014).

Eidson, Agilent Technologies, "IEEE-1599 Standard for a Precision Clock Synchronization Protocol for Networked Measurement and Control Systems", A Tutorial, 94 pgs. (Oct. 10, 2005).

Vmware, White Paper, Virtualization Overview, 11 pgs. (2006).

Cisco, "Data Center Fabric With Nanosecond Accuracy-Use IEEE1588 PTP on Nexus 3000 Switches", 13 pgs. (Jun. 2012).

Albedo Telecom, "Synchronization & Mobile Networks", White paper, 15 pgs. (2013).

Response to Office Action filed Jan. 29, 2016; Karnes, "Network Packet Timing Synchronization for Virtual Machine Host Systems", Filed Oct. 15, 2014, U.S. Appl. No. 14/514,999, 8 pgs.

Notice of Allowance dated Feb. 10, 2016, Karnes, "Network Packet Timing Synchronization for Virtual Machine Host Systems", U.S. Appl. No. 14/514,999, filed Oct. 15, 2014, 9 pgs.

Office Action dated Jun. 2, 2016, Karnes, "Methods and Systems for Forwarding Network Packets Within Virtual Machine Host Systems", U.S. Appl. No. 14/515,043, filed Oct. 15, 2014, 28 pgs.

Response to Office Action filed Oct. 3, 2016, Karnes, "Methods and Systems for Forwarding Network Packets Within Virtual Machine Host Systems", U.S. Appl. No. 14/515,043, filed Oct. 15, 2014, 9 pgs.

Final Office Action filed Jan. 10, 2017, Karnes, "Methods and Systems for Forwarding Network Packets Within Virtual Machine Host Systems", U.S. Appl. No. 14/515,043, filed Oct. 15, 2014, 27pgs.

Office Action, Karnes, "Methods and Systems for Forwarding Network Packets Within Virtual Machine Host Systems", U.S. Appl. No. 14/515,043, filed Oct. 15, 2014, 25 pgs.

Response to Final Office Action, Karnes, "Methods and Systems for Forwarding Network Packets Within Virtual Machine Host Systems", U.S. Appl. No. 14/515,043, filed Oct. 15, 2014, 27pgs.

Response to Office Action, Karnes, "Methods and Systems for Forwarding Network Packets Within Virtual Machine Host Systems", U.S. Appl. No. 14/515,043, filed Oct. 15, 2014, 7 pgs.

Notice of Allowance dated Jan. 19, 2018, Karnes, "Methods and Systems for Forwarding Network Packets Within Virtual Machine Host Systems", U.S. Appl. No. 14/515,043, filed Oct. 15, 2014, 12 pgs.

Wang, "Virtual Routers on the Move: Live Router Migration as a Network Management Primitive", SIGCOMM, 12 pgs. (2008).

Nicira, "Virtualizing the Network Forwarding Plane", ACM Presto, 6 pgs. (2010).

Bhatia, "Trellis: A Platform for Building Flexible, Fast Virtual Networks on Commodity Hardware", 6 pgs. (2008).

(56) References Cited

OTHER PUBLICATIONS

Rizzo et al., "Vale, A Switched Ethernet for Virtual Machines", 12 pgs. (2012).
Natarajan et al., "Encrypted Packet Forwarding in Virtualized Networks", 2 pgs. (2011).
Cessa et al., "Evaluation of Switching Performance of a Virtual Software Router", Department of Electrical and Computer Engineering, 5 pgs. (2012).

\* cited by examiner

METHODS AND SYSTEMS FOR NETWORK PACKET IMPAIRMENT WITHIN VIRTUAL MACHINE HOST SYSTEMS

TECHNICAL FIELD OF THE INVENTION

This invention relates to network packet communication systems and, more particularly, to network packets communicated within virtual machine host systems.

BACKGROUND

Packet-based data networks continue to grow in importance, and it is often desirable to test network infrastructure associated with these packet-based networks. To meet these testing needs, impairments can be intentionally introduced to network packets to evaluate performance and detect operational problems with the applications, services, appliances or other devices operating within the network. These intentional impairments are often useful in detecting and diagnosing problems within such network deployed elements.

Certain network communication systems include virtualized processing environments, such as virtual machine (VM) platforms hosted by one or more processing devices, to provide processing resources to user processing systems. For example, network cloud resources made available to network-connected systems are often virtualized such that processors or processing cores associated with a server processing platform (e.g., server blade) and/or combinations of such server processing platforms are used to provide software processing instances or virtual machine platforms within cloud server processing systems. A virtual machine (VM) platform is an emulation of a particular processing system that is created within software being executed on a VM host hardware system. By creating VM platforms within a VM host hardware system, the processing resources of that VM host hardware system can be more easily shared among network connected systems that desire to use these processing resources.

FIG. 1 (Prior Art) is a block diagram of an example embodiment for a VM host hardware system 100 that communicates through an external network 118 to network infrastructure 150 for a user of the VM host hardware system 100. For the example embodiment depicted, the VM host hardware system 100 includes a central processing unit (CPU) 102 that runs a VM host operating system 154. An interconnect bridge 108 can also be provided to couple the CPU 102 to additional circuitry and devices within the server system 100. For example, a system oscillator 110, a real-time clock 112, a network interface card (NIC) 115, and other hardware (H/W) 114 can be coupled to the CPU 102 through the interconnect bridge 108. The system oscillator 110 can also have a direct connection to the CPU 102. The NIC 115 can also include an oscillator 116. The real-time clock 112 can be implemented using an integrated circuit including real time clock (RTC) circuitry and non-volatile read only memory (NVRAM) integrated within an integrated circuit (IC).

The VM host hardware system 100 includes a hypervisor 152 that executes on top of the VM host operating system (OS) 154. This hypervisor 152 provides a virtualization layer including a plurality of VM platforms 156A, 156B, 156C . . . that emulate processing systems and related processing resources. As shown with respect to VM platform 156A, each of the VM platforms 156A, 156B, and 156C have one or more virtual hardware resources associated with it, such as a virtualized network interface card (NIC) 158A, a virtualized CPU 160A, a virtualized real-time clock (RTC) 162A, and/or other virtualized hardware resources. The VM host hardware system 100 makes each of the VM platforms 156A-C available for use by one or more network-connected guest systems through the VM host operating system 154 and the hypervisor 152. It is noted that the hypervisor 152 provides a management and control virtualization interface layer between the VM platforms 156A-C and the guest systems using the processing resources provided by the VM platforms 156A-C. It is further noted that the VM host operating system 154, the hypervisor 152, the VM guests 156A-C, and the virtualized hardware resources 158A/160A/162A can be implemented, for example, as computer-readable instructions stored in a non-transitory data storage medium that are accessed and executed by one or more processing devices, such as the CPU 102, to perform the functions for the VM host hardware platform 100.

FIG. 2 (Prior Art) is a block diagram of an embodiment 200 where a virtual switch 204 has been included along with the hypervisor 152 within a virtualization layer 202. The virtualization layer 202 can provide one or more virtualized hardware components, such as for example virtualized input/output (IO) interfaces, virtualized network interfaces, virtualized CPUs, virtualized storage mediums, and/or other virtualized components. The virtual switch 204 provides virtual network packet forwarding among the VM platforms 156A, 156B, 156C, and 156D that are hosted as guest processes within the host operating system 154. In particular, the virtual switch 204 communicates with the virtualized NICs 158A, 158B, 158C, and 158D for the VM guest platforms 156A, 156B, 156C, and 156D to forward network packets among the VM guest platforms 156A, 156B, 156C, and 156D and between the VM guest platforms 156A, 156B, 156C, and 156D and the external network 118.

When a VM user network infrastructure 150 desires to test network communication infrastructure within a virtual environment such as provided by the embodiments in FIGS. 1-2 (Prior Art), problems may be present in VM performance caused by various impairments of virtual network traffic caused by interaction with other virtual environment elements. One such example environment is where virtual processing resources within a cloud-based server system are offered by a controlling entity (e.g., Amazon Web Services) to different user entities that lease, rent, or otherwise pay for server cloud resources from the controlling entity. If a user entity desires to test its network infrastructure, the user does not have direct access to or control of the cloud-based network infrastructure. As such, testing performance in the presence of network impairments within a user's rented or leased resources within a cloud-based server system is difficult to achieve.

Further, when developers of virtual appliances (e.g., firewall or router) or virtual services (e.g., video streaming or workforce management) desire to test their appliances or services prior to deployment in VM environments, traditional test devices that introduce intentional impairments to network packets are inadequate to introduce network-layer impairments within the virtual network environment. As such, these developers are unable to effectively test performance of their virtual appliances/services in the presence of virtual network impairments.

SUMMARY OF THE INVENTION

Methods and systems for network packet impairment within virtual machine (VM) host systems are disclosed that provide virtual impairment processors within VM hardware systems. One or more processing devices within a virtual machine (VM) host system are operated to provide at least one virtual machine (VM) platform, a virtual switch, and a virtual impairment processor within a virtualization layer for the VM host system. Network packets associated with packet traffic for the at least one VM platform using the virtual switch. The virtual impairment processor then applies one or more impairments to the network packets such as a drop, modify, delay, and/or other packet impairment. The impaired packets are then forwarded by the virtual switch to target destinations for the impaired network packets using the virtual switch. Different features and variations can be implemented, as desired, and related systems and methods can be utilized, as well.

In one embodiment, a method to impair packets within a virtual machine host system is disclosed that includes operating one or more processing devices within a virtual machine (VM) host system to provide at least one virtual machine (VM) platform, a virtual switch, and a virtual impairment processor within a virtualization layer for the VM host system; receiving virtual network packets associated with virtual packet traffic for the at least one VM platform using the virtual switch; applying one or more impairments to the virtual network packets using the virtual impairment processor; and forwarding the impaired virtual network packets to target destinations for the impaired virtual network packets using the virtual switch.

For other embodiments, the method further includes determining if impairments are to be applied to the received virtual network packets before applying the one or more impairments. In additional embodiments, a plurality of different impairments are applied to the virtual network packets. Further, the one or more impairments can include at least one a packet drop impairment or a packet modify impairment. Still further, the one or more processing devices can be operated to provide a plurality of VM platforms within the VM host system.

For further embodiments, the one or more impairments can include a packet delay impairment. In addition, the method can include scheduling output of the impaired virtual network packets based upon the packet delay impairments for the impaired virtual network packets. Further, different packet delays can be applied to different received virtual network packets.

For still further embodiments, the method includes applying one or more packet content filters using the virtual impairment engine to determine selected virtual network packets for application of the one or more impairments. In additional embodiments, the method includes determining multiple different groups of selected virtual network packets and applying different impairments to the multiple different groups of selected virtual network packets. Still further, the method can include configuring the one or more packet content filters using a configuration interface.

In one other embodiment, a virtual machine (VM) host system having virtual packet impairment is disclosed that includes one or more processing devices configured to provide a virtualization layer comprising at least one virtual machine (VM) platform, a virtual switch, and a virtual impairment processor. The virtual switch is configured to receive virtual network packets associated with virtual packet traffic for the at least one VM platform. The virtual impairment processor is configured to apply one or more impairments to the virtual network packets. And the virtual switch is further configured to forward the impaired virtual network packets based upon target destinations for the impaired virtual network packets.

For other embodiments, the virtual impairment processor is configured to apply a plurality of different impairments to the virtual network packets. In additional embodiments, the virtual impairment processor includes an impairment engine configured to apply at least one of a packet drop impairment or a packet modify impairment as the one or more impairments.

For further embodiments, the virtual impairment processor includes an impairment engine configured to apply a packet delay impairment as the one or more impairments. For additional embodiments, the virtual impairment processor includes a scheduler configured to control output of the impaired virtual network packets based upon the packet delay impairments for the impaired virtual network packets. Still further, the impairment engine can be configured to apply different packet delays to different received virtual network packets.

For still further embodiments, the virtual impairment processor includes one or more packet content filters within the virtual impairment processor configured to identify one or more selected groups of virtual network packets for application of the one or more impairments. In addition, the one or more content filters can be configured to determine multiple different groups of selected virtual network packets and to apply different impairments to the multiple different groups of selected virtual network packets. Further, the virtual impairment processor can include a configuration interface for the one or more packet content filters.

Different and/or additional features, variations, and embodiments can also be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Methods and systems network packet impairment within virtual machine (VM) host systems are disclosed that provide virtual impairment processors within VM host hardware systems. One or more processing devices within a virtual machine (VM) host system are operated to provide at least one virtual machine (VM) platform, a virtual switch, and a virtual impairment processor within a virtualization layer for the VM host system. Network packets associated with packet traffic for the at least one VM platform using the virtual switch. The virtual impairment processor then applies one or more impairments to the network packets such as a drop, modify, delay, and/or other packet impairment. The impaired packets are then forwarded by the virtual switch to target destinations for the impaired network packets using the virtual switch. Different features and variations can be implemented, as desired, and related systems and methods can be utilized, as well.

As described above, virtual switches for network packets in virtual machine (VM) host hardware systems have been used in virtual environments to emulate real physical layer network packet switches. The embodiments described herein provide mechanisms for virtual impairment processors that add intentional impairments to packet traffic within the virtualization layer to facilitate evaluation of performance or operation of applications, services, virtual appliances or other features of the virtual network environment in the presence of such virtual impairments.

Figure 3:
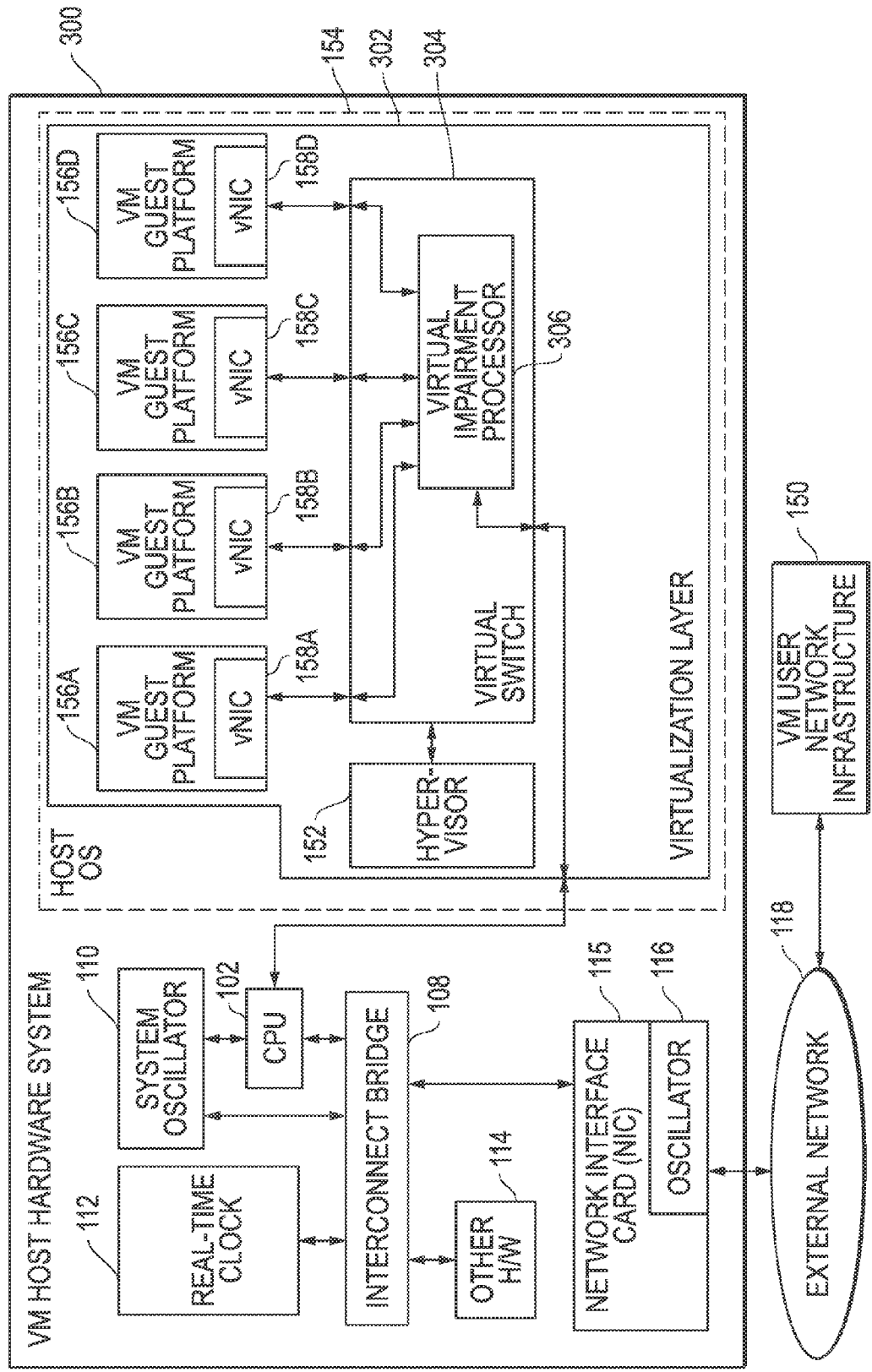
FIG. 3 is a block diagram of an example embodiment for a virtual machine (VM) host hardware system having a virtual impairment processor configured to impair network packets received by a virtual switch.

FIG. 3 is a block diagram of an example embodiment for a virtual machine (VM) host hardware system 300 having a virtual impairment processor 306 associated with the virtual switch 304. The virtual impairment processor 306 receives network packets being forwarded by the virtual switch 304 and applies one or more intentional impairments to these network packets. The network packets can also be left in their original condition, if desired, without the application of impairments by the virtual impairment processor 306. As described further below, the impairments applied by the virtual impairment processor 306 can include a drop impairment where the packet is dropped, a modify impairment where the packet contents are modified, a delay impairment where the packet is delayed, and/or other packet impairments. Once processed by the virtual impairment processor 306 if impairments are to be added, the impaired packets are then forwarded by the virtual switch 304 to the target destination for the packet. The operation of virtual network devices, services, applications, and/or other infrastructure can then be analyzed based upon the virtual impairments introduced by the virtual impairment processor 306. It is further noted that multiple impairments can be added to each packet and different impairments can be added to different packets. Other variations can also be implemented.

Figure 1:
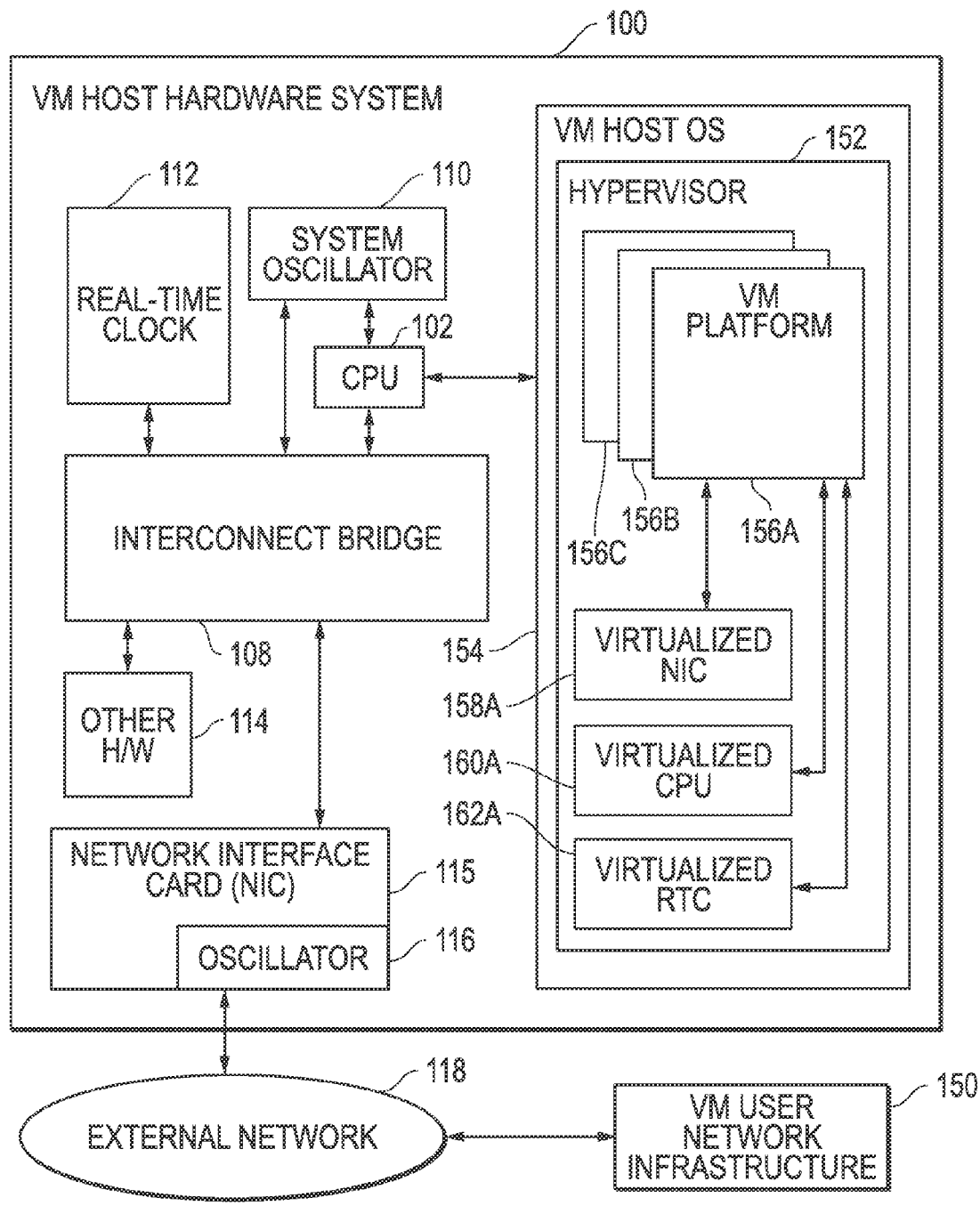
FIG. 1 (Prior Art) is a block diagram of an example embodiment for a virtual machine (VM) host hardware system that communicates with an external network.
Figure 2:
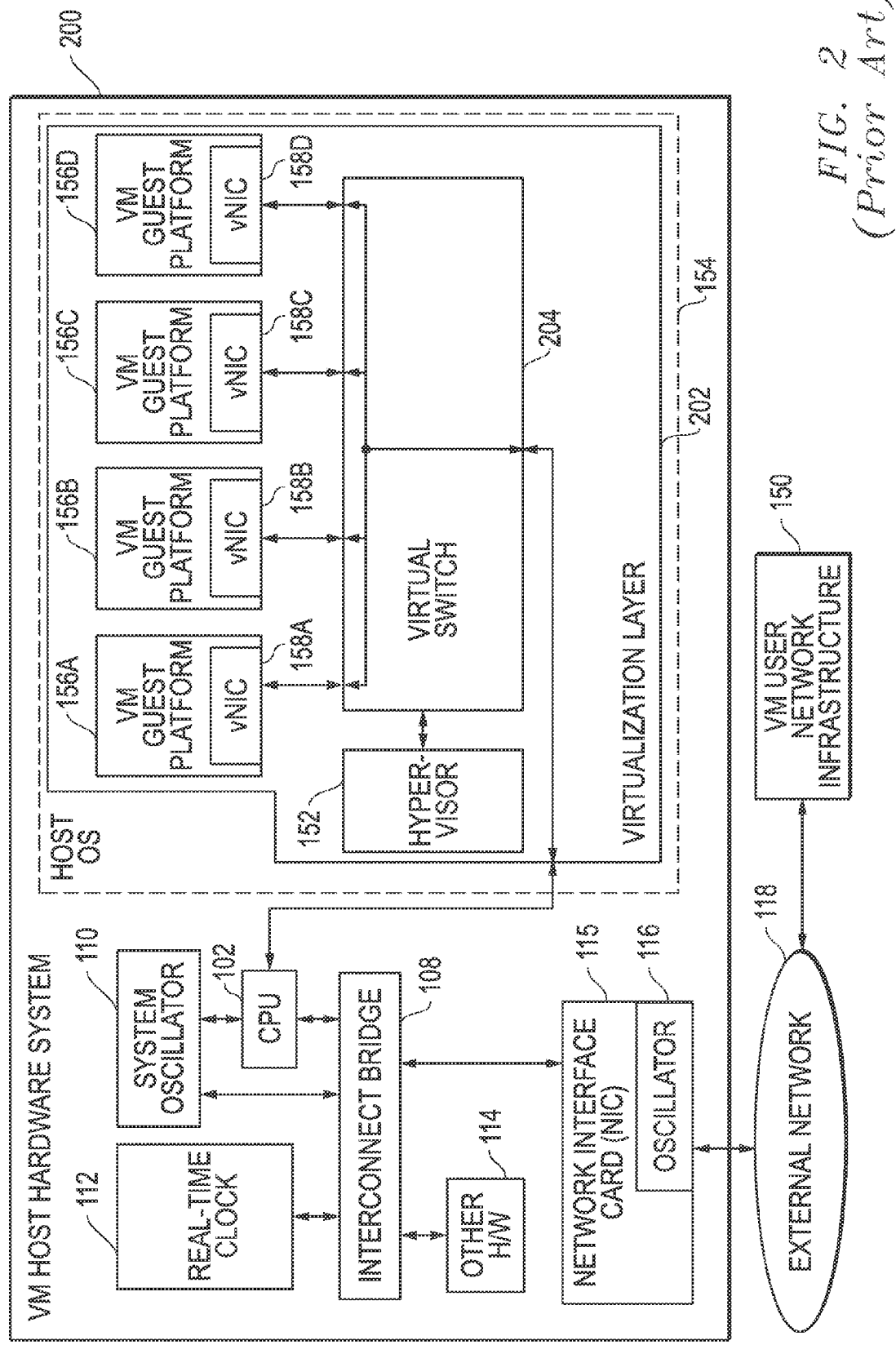
FIG. 2 (Prior Art) is a block diagram of an embodiment where a virtual switch has been included along with the hypervisor within a virtualization layer for a VM host hardware system.

It is noted that the VM host hardware system 300 in part operates in a similar fashion to embodiment 200 of FIG. 2 (Prior Art). The VM host hardware system 300 includes a central processing unit (CPU) 102 that runs a host operating system 154, a system oscillator 110, a real-time clock 112, a network interface card (NIC) 115, and other hardware (H/W) 114 coupled to communicate with the CPU 102 through an interconnect bridge 108. The NIC 115 can also include an oscillator 116, and the system oscillator 110 can also be directly connected to the CPU 102. The real-time clock 112 can be implemented using an integrated circuit including a real time clock (RTC) circuitry and non-volatile read only memory (RTC/NVRAM). The VM host hardware system 400 also includes a hypervisor 152 that executes as part of the virtualization layer 302 on top of the VM host operating system (OS) 154. This hypervisor 152 provides access to a plurality of VM platforms 156A, 156B, 156C, and 156D that emulate processing systems and related processing resources. In part, the VM platforms 156A, 156B, 156C, and 156D have virtualized network interface cards (vNICs) 158A, 158B, 158C, and 158D that are coupled to the virtual switch 304 within the virtualization layer 302.

As described above, one or more additional virtual hardware resources could also be associated with the VM platforms 156A, 156B, 156C, and 156D such as for example virtualized input/output (IO) interfaces, virtualized network interfaces, virtualized CPUs, virtualized storage mediums, and/or other virtualized components. The VM host hardware system 300 makes each of the VM platforms 156A, 156B, 156C, and 156D available for use by one or more network-connected guest systems. It is further noted that the VM host operating system 154, the hypervisor 152, the virtualization layer 302, the virtual impairment processor 306, and the VM guest platforms 206A-D can be implemented, for example, as computer-readable instructions stored in a non-transitory data storage medium that are accessed and executed by one or more processing devices, such as the CPU 102, to perform the functions for the VM host hardware platform 300.

As described above, the virtual switch 304 provides virtual network packet communications among the VM platforms 156A, 156B, 156C, and 156D that are hosted as guest processes within the host operating system 154. In particular, the virtual switch 304 communicates with the virtualized NICs 158A, 158B, 158C, and 158D for the VM guest platforms 156A, 156B, 156C, and 156D to forward network packets among the VM guest platforms 156A, 156B, 156C, and 156D and between the VM guest platforms 156A, 156B, 156C, and 156D and the external network 118. The packets traversing the virtual switch 304 are also routed through the virtual impairment processor 306 where impairments can be selectively applied to the network packets. The virtual impairment processor 306 analyzes and impairs packets based upon content filters defined within the virtual impairment processor 306.

It is again noted that the VM host hardware system 300 can be implemented, for example, using one or more processing devices such as processors and/or configurable logic devices. Processors (e.g., microcontrollers, microprocessors, central processing units, etc.) can be programmed and used to control and implement the functionality described herein, and configurable logic devices such as CPLDs (complex programmable logic devices), FPGAs (field programmable gate arrays), and/or other configurable logic devices can also be programmed to perform desired functionality.

Figure 4:
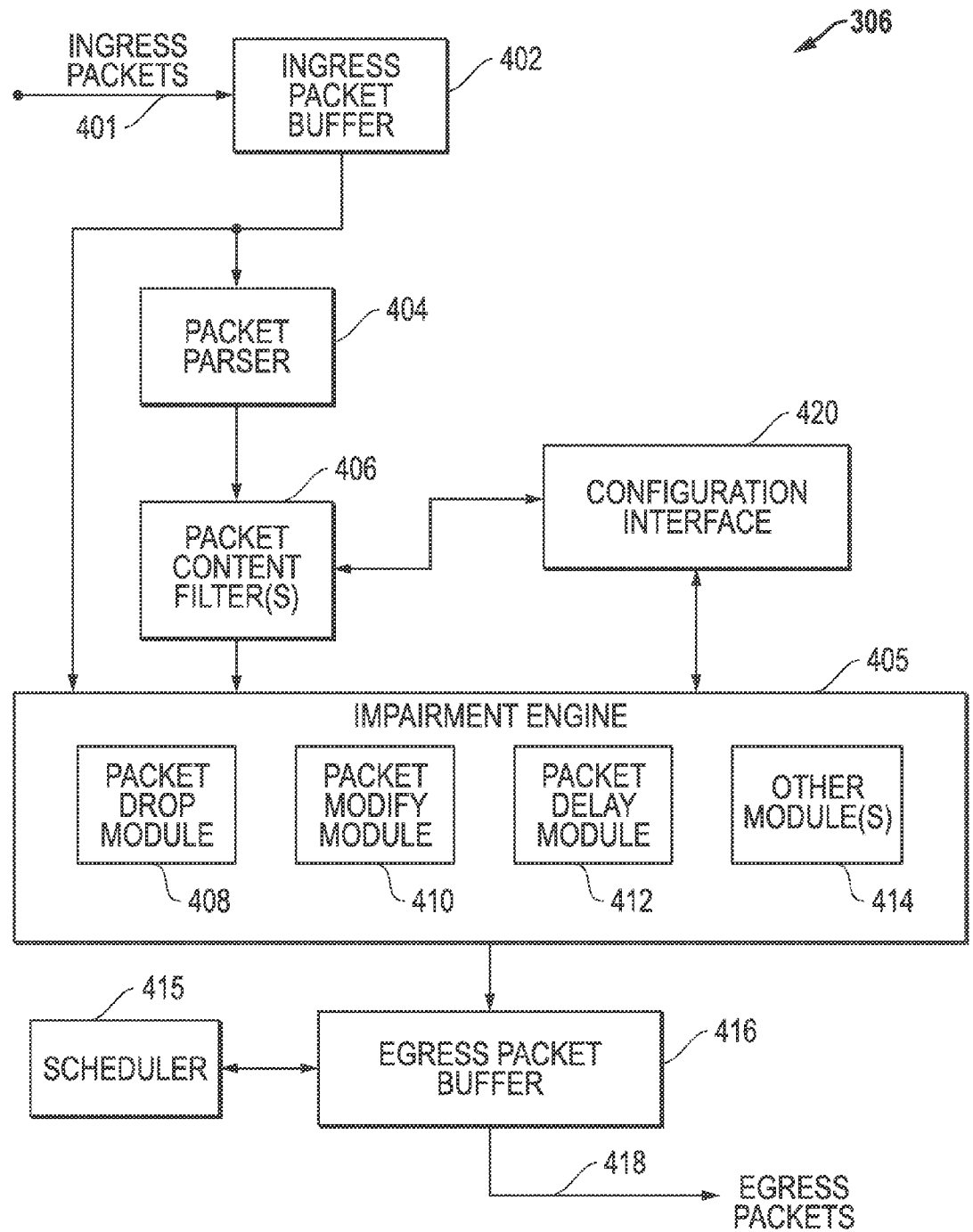
FIG. 4 is a block diagram of an example embodiment for a virtual impairment processor.

FIG. 4 is a block diagram of an example embodiment for virtual impairment processor 306. Ingress packets 401 within the virtual switch 304 are received and stored within the ingress packet buffer 402. A packet parser 404 then analyzes the ingress packets and provides packet contents to one or more packet content filters 406. The packet content filters 406 are defined, for example, using a configuration interface 420. The configuration interface 420 allows for user configuration of the content filters 406 through one or more external interfaces for the VM host hardware system 300. The content filters 406 identify one or more selected groups of packets for application of impairments and provide appropriate impairment instructions to the impairment engine 405. The impairment engine 405 can also receive the original ingress packets from the ingress packet buffer 402. Within the impairment engine 405, the packets can be processed using one or more impairments or can remain un-impaired depending upon the impairment determinations made by the content filters 406. For example, packets identified for a drop impairment are processed by the packet drop module 408 where the packets are discarded to create a drop impairment. Packets identified for a modify impairment are processed by the packet modify module 410 where contents of packets are modified to create a modify impairment. For example, header information, payload information, error correction code information, and/or other contents of a packet can be modified to provide the modify impairment. Packets identified for a delay impairment are processed by the packet delay module 412 where the packet is delayed by a selected amount of time. One or more different delay amounts can also be applied to different packets to generate different delay impairments. Other packet impairments can also be applied by one or more additional impairment module(s) 414. The impaired output packets from the impairment engine 405 are provide to the egress packet buffer 416. Un-impaired packets are also forwarded to the egress packet buffer 416. The egress packets 418 are then forwarded by the virtual switch 304 to appropriate target destinations as indicated within the egress packets 418. A scheduler 415 can be used to schedule release of egress packets 418, for example, based upon any delay impairments applied to the packets by the impairment engine 405. Other variations could also be implemented.

It is noted that the content filters 406 can rely upon various portions of the content of ingress packets 401 to identify which packets will be impaired and to determine what impairments will be applied. For example, network packets typically include in part a link layer header (L2), a network layer header (L3), a transport layer header (L4), and a payload, as well as other network layers (e.g., layers within the Open Systems Interconnect (OSI) model for network communications). Information pertinent to forwarding the packet, such as source ID (identifier) and destination ID and protocol type, is usually found in the packet headers. These packets may also have various other fields and information within them, such as fields including error check information, virtual local area network (VLAN) addresses, and/or other information that may be matched and used for filtering. Further, information representing the source device may include items such as the IP address of the source device or the MAC (Media Access Control) address of the source device. It is seen, therefore, that a wide variety of source and destination identifying information may be included within the virtual copied packets, as well as other packet related information along with the data included within the payload of the packet. The packet content filters 406 utilize one or more selected portions of these packet contents to make decisions about which packets will be impaired and what impairments to apply. Based upon the packet content filters 406, the appropriate impairment modules 408, 410, 412, and/or 414 within the impairment engine 405 are applied to the packets.

Figure 5:
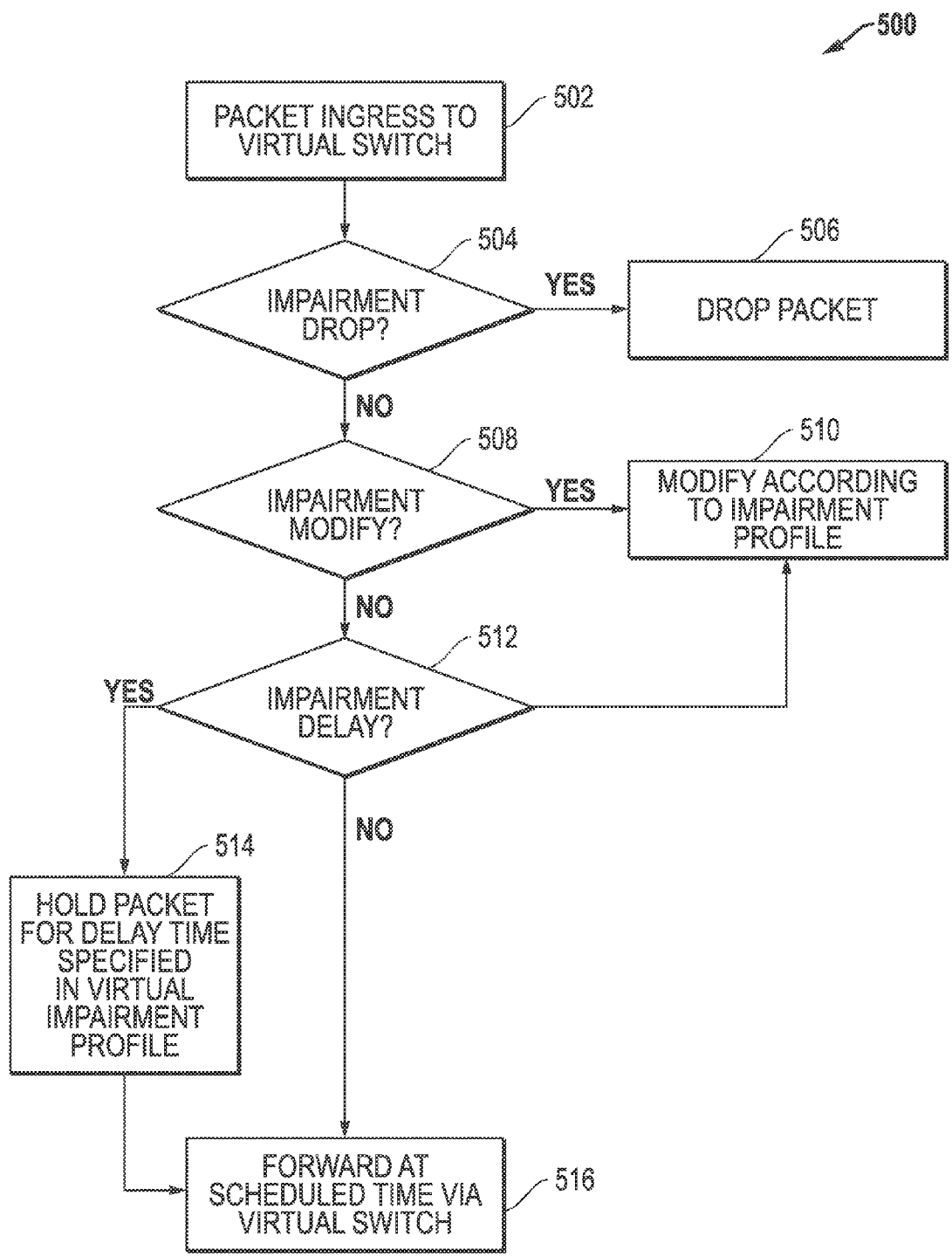
FIG. 5 is a process flow diagram of an embodiment for receiving packets with a virtual switch and applying drop, modify, and/or delay impairments to the received packets.

FIG. 5 provides a process flow diagram of an embodiment 500 for the operation of a virtual impairment processor 306 within a virtual switch 304 to apply impairments to virtual network packets. In block 602 an ingress network packet is received at the virtual switch 304. In block 604, a determination is made whether an impairment drop is to be applied to the packet. If "YES," then flow passes to block 506 where the packet is dropped or discarded. If "NO," then flow passes to block 508 where a determination is made whether a modify impairment is to be applied to the packet. If the determination in block 508 is "YES," then flow passes to block 510 where the packet is modified according to an impairment profile which can be defined, for example, using the configuration interface 420 to determine how the packet will be modified. Flow then passes to block 512. If the determination in block 508 is "NO," then flow passes directly to block 512. In block 512, a determination is made whether a delay impairment is to be added to the packet. If "NO," then flow passes to block 516. If "YES," then flow passes to block 514 where the packet is held for a delay time specified in an impairment profile which can again be defined, for example, using the configuration interface 420 to determine the delay time amount to be applied to the delivery of the packet. Flow then passes to block 516 where packets are forwarded by the virtual impairment processor 306 to the virtual switch 304 at the scheduled time for the packet according to any delay impairment added to the packet. Other variations and process steps could also be utilized while still taking advantage of the virtual packet impairment techniques described herein.

U.S. patent application Ser. No. 14/514,999, which was concurrently filed on the same date as the present Application and is entitled "NETWORK PACKET TIMING SYNCHRONIZATION FOR VIRTUAL MACHINE HOST SYSTEMS," is hereby incorporated by reference in its entirety. This concurrently filed Patent Application describes example embodiments that provide timing synchronization within VM host hardware systems and that determine residence time for packets traversing a virtual switch within a virtualization layer for a VM host hardware system. The packet impairment embodiments described herein can utilize one or more of the embodiments described in this concurrently filed application to provide synchronized timestamps, to determine virtual packet residence time within the virtual switch 304, to schedule the release of packets according to delay impairments added to the packets, and/or for other purposes within the embodiments described herein.

It is noted that the operational and functional blocks described herein can be implemented using hardware, software or a combination of hardware and software, as desired. In addition, integrated circuits, discrete circuits or a combination of discrete and integrated circuits can be used, as desired, that are configured to perform the functionality described. Further, configurable logic devices can be used such as CPLDs (complex programmable logic devices), FPGAs (field programmable gate arrays), ASIC (application specific integrated circuit), and/or other configurable logic devices. In addition, one or more processors running software or firmware could also be used, as desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, processors, programmable circuitry (e.g., FPGAs, CPLDs), and/or other processing devices to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU (central processing unit), controller, microcontroller, processor, microprocessor, FPGA, CPLD, ASIC, or other suitable processing device or combination of such processing devices.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to impair packets within a virtual machine host hardware system, comprising:
   operating one or more processing devices within a virtual machine (VM) host hardware system, including at least one of a central processing unit (CPU), a processor, or a configurable logic device, to provide a plurality of virtual machine (VM) platforms and a virtual switch including a virtual impairment processor within a virtualization layer for the VM host hardware system; and
   with the virtual switch,
   receiving virtual network packets associated with virtual packet traffic for the plurality of VM platforms, the virtual network packets having the plurality of VM platforms as target destinations;
   applying a plurality of different impairments to the virtual network packets to generate impaired virtual network packets for the plurality of VM platforms, the plurality of different impairments comprising both a packet delay impairment and a packet modify impairment; and
   forwarding the impaired virtual network packets to the plurality of VM platforms as the target destinations for the impaired virtual network packets to facilitate evaluation of performance of the plurality of VM platforms;
   wherein the applying comprises for each virtual network packet:
      selectively applying a drop impairment; and
      if a drop impairment is not applied:
         selectively applying a modify impairment; and
         selectively applying a delay impairment.

2. The method of claim 1, further comprising determining if impairments are to be applied to the received virtual network packets before applying the one or more impairments.

3. The method of claim 1, further comprising scheduling output of the impaired virtual network packets based upon the packet delay impairments for the impaired virtual network packets.

4. The method of claim 1, wherein different packet delays are applied to different received virtual network packets.

5. The method of claim 1, further comprising applying one or more packet content filters to determine selected virtual network packets for application of the one or more impairments.

6. The method of claim 5, further comprising determining multiple different groups of selected virtual network packets and applying different impairments to the multiple different groups of selected virtual network packets.

7. The method of claim 5, further comprising configuring the one or more packet content filters using a configuration interface.

8. A virtual machine (VM) host hardware system having virtual packet impairment, comprising:
   one or more processing devices, including at least one of a central processing unit (CPU), a processor, or a configurable logic device, programmed to:
   provide a virtualization layer comprising a plurality of virtual machine (VM) platforms and a virtual switch including a virtual impairment processor; and with the virtual switch,
   receive virtual network packets associated with virtual packet traffic for the plurality of VM platforms, the virtual network packets having the plurality of VM platforms as target destinations;
   apply a plurality of different impairments to the virtual network packets to generate impaired virtual network packets for the plurality of VM platforms, the plurality of different impairments comprising both a packet delay impairment and a packet modify impairment; and
   forward the impaired virtual network packets to the plurality of VM platforms as the target destinations for the impaired virtual network packets to facilitate evaluation of performance of the plurality of VM platforms;
   wherein the one or more impairments applied for each virtual network packet comprises:
      a selectively applied drop impairment; and
      if a drop impairment is not applied:
         selectively applying a modify impairment; and
         selectively applying a delay impairment.

9. The VM host hardware system of claim 8, wherein the one or more processing devices are further programmed to control output of the impaired virtual network packets based upon the packet delay impairments for the impaired virtual network packets using the virtual switch.

10. The VM host hardware system of claim 8, wherein the one or more processing devices are further programmed to apply different packet delays to different received virtual network packets using the virtual switch.

11. The VM host hardware system of claim 8, wherein the one or more processing devices are further programmed to apply one or more packet content filters to identify one or more selected groups of virtual network packets for application of the one or more impairments using the virtual switch.

12. The VM host hardware system of claim 11, wherein the one or more processing devices are further programmed to use the one or more content filters to determine multiple different groups of selected virtual network packets and to apply different impairments to the multiple different groups of selected virtual network packets using the virtual switch.

13. The VM host hardware system of claim 11, wherein the one or more processing devices are further programmed to provide a configuration interface for the one or more packet content filters.

* * * * *